March 30, 1948.  B. LIEBOWITZ  2,438,759
MANUFACTURE OF COMPOSITE STEEL PLATES
Filed May 21, 1941
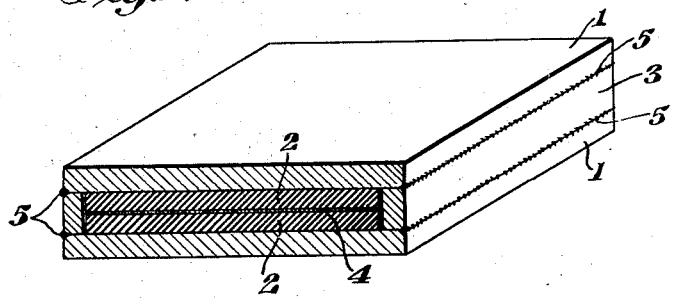
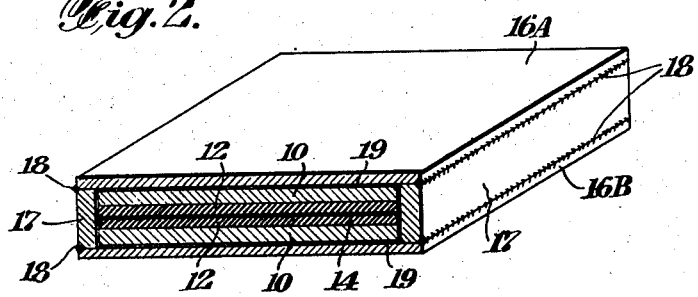
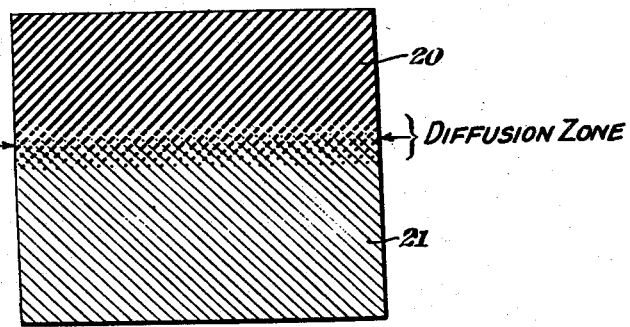
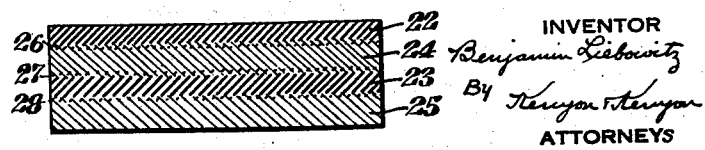
INVENTOR
Benjamin Liebowitz
By Kenyon & Kenyon
ATTORNEYS Patented Mar. 30, 1948

2,438,759

UNITED STATES PATENT OFFICE 2,438,759

MANUFACTURE OF COMPOSITE STEEL PLATES

Benjamin Liebowitz, Lewisboro, N. Y.

Application May 21, 1941, Serial No. 394,508

15 Claims. (Cl. 29—189)

This invention relates to the manufacture of composite steel plates. I will describe this invention principally in connection with composite light armor plate, for which it is of particular utility, although the invention is not necessarily limited to this particular field.

At the present time there are two types of light armor plate in use, one known as "case hardened" and the other as "homogeneous." The case hardened plate is made by using a so-called "carburizing" alloy steel which is carburized on one surface to a depth in the neighborhood of 20 or 30% of its thickness. This plate is hardened by heating and quenching and then given a light "draw" which leaves the plate with a very hard outside surface and a tough backing. Homogeneous armor plate consists of a tough steel throughout. In the lighter gauges, say, up to ¾ inch in thickness, the case hardened plate has much greater stopping power for a given thickness than the homogeneous, but has a tendency to "shatter" and/or "spall" when struck by a projectile of greater energy than the stopping power of the plate. Many attempts have been made heretofore to make armor plate that is better than the "case hardened" or "homogeneous" armor plates by welding together, face to face, a plate of hard steel and a plate of soft steel by means of roll-welding. But, so far as I am aware, this has not heretofore been accomplished. The primary object of this invention is to overcome the difficulties hitherto experienced and to produce composite armor plate, sheets, strips, and the like, which have improved properties, as will hereinafter be described.

By way of a definite example, I will describe armor plate comprising two specific steels, viz., a hardenable die steel of the following approximate composition:

| | Per cent |
|---|---|
| Carbon | 0.95 |
| Manganese | 1.60 |
| Molybdenum | 0.25 | and a tough steel of the following approximate composition:

| | Per cent |
|---|---|
| Carbon | 0.20 |
| Nickel | 1.80 |
| Molybdenum | 0.25 |
| Manganese | 0.55 |

These percentages give the principal alloying elements and may vary, of course, according to commercial tolerances. The first of these steels is known in the trade as Ryalloy, the second as S. A. E. Specification #4620. It must be definitely understood, however, that my invention is by no means limited to these specific materials.

The problem of face-to-face welding of these two steels or similar combinations with sufficient bond strength for ballistic purposes has been solved by this invention. One of the main features of this invention, as will hereinafter be more fully described, consists in first superposing the steels and forming, by rolling or otherwise, a preliminary bond between the two faces, then subjecting the combined plates to a "heat soaking" for several hours at a temperature in the neighborhood of 2200° F., so as to establish a carbon gradient between the hard steel and the tough steel, thereby minimizing the abrupt change in properties which would otherwise occur at the interface. After the establishment of the carbon gradient, the composite material is rolled to its final thickness. This feature and other features of the invention will become clearer from the further description and by reference to the drawings, in which Figure 1 is a perspective view, partly in cross-section, of a "sandwich" prepared for roll welding;

Figure 2 is a perspective view, partly in cross-section of a box construction containing plates ready for roll welding;

Figure 3 is a diagrammatic representation in section showing the carbon gradient in the diffusion zone between welded plates, and Figure 4 is a cross-sectional view of an embodiment of my invention comprising more than one zone of union between unlike steel plates.

Referring to the Fig. 1, 1—1 represents a pair of slabs of tough steel, and 2—2 is a pair of slabs of hard steel. (The word "hard" is used throughout as a designation whether or not the steel is in its hardened state. A similar remark applies to the word "tough.") As indicated, the two hard slabs are placed between two tough slabs which overhang the former all around so as to allow space for the union bars 3. Between the two hard slabs a layer of weld-preventing material, such as magnesium oxide, is placed, as indicated at 4. The side bars are peripherally welded to the tough plates all around as indicated at 5.

Prior to making this assembly, the abutting surfaces of the plates to be welded are first thoroughly freed from scale and cleaned. It has been found that the methods which are frequently employed for this purpose, e. g., sandblasting or shotblasting, are very undesirable because they cause sand or other foreign material to adhere to the surfaces to be welded and thereby interfere with the welding process. A suitable method consists of grinding the surfaces with the flat rim of a cup-shaped wheel. If any oxide forms during this process on account of the heat generated in the grinding, it should be removed by means of a lighter grinding operation. Or the surfaces may be rendered clean and free of scale by machining or by other suitable methods.

In the preparation of the surface I have found it advantageous to employ promptly after the cleaning a light covering of a hydrocarbon, such as xylene or kerosene. This thin continuous coating serves to protect the steel temporarily against rusting or formation of invisible oxides during subsequent processing and handling prior to or during the sealing of the surfaces in the sandwich.

Instead of forming a sandwich, such as shown in Fig. 1, I may make a box of steel as shown in Fig. 2, where the tough steel is shown at 10—10, and the hard steel at 12—12, with the weld-preventing layer between the two hard steels at 14. The box consists of an upper cover plate 16A and a lower cover plate 16B, joined by side bars 17—17 on all four sides of the box by means of the peripheral welds 18, thereby forming a complete enclosure for the plates inside. It will be understood that there is a weld-preventing layer also between each cover plate and its adjoining steel, as indicated at 19—19. It will also be understood that in the box method I may enclose any number of pairs of hard and tough plates to be welded together with weld-preventing layers provided at surfaces that are not to be welded. A suitable material for the box is S. A. E. 1035 or 1045, which is a relatively inexpensive "straight carbon" steel.

While the sandwich method of rolling is not novel, the box method illustrated in Fig. 2 is new, so far as I am aware. In this box method, it will be understood, the entire container is rolled with the steel inside until the hot rolling operations have been substantially completed. In order to withstand the rolling stresses, the side bars 17 of the box must be of substantial thickness, and the cover plates also must be of substantial thickness. A container consisting of ordinary sheet steel will not operate because such a container will be destroyed practically in the first pass. The total cross-sectional area of the metal of the box should not be less than about 25% of the total cross-sectional area of the box. After completion of the hot-rolling operations the box container is removed by shearing along the edges.

In general, the metal of the box then becomes scrap material, but this is not a serious disadvantage in comparison with the advantages gained. In the first place, the box method permits the use of higher temperatures and hence shorter furnace time in the gradient forming operation. In the second place, the sandwich method of Fig. 1 exposes the tough steel to the ambient atmosphere in the furnace and, at the temperatures employed in this process, a considerable amount of scaling results, and also some decarburization, which may be very objectionable. While scaling can be reduced by covering the surface with "coke breeze" or similar carbonaceous material while it is in the furnace, it is not always a convenient mill operation. Another advantage of the box method is that it makes it unnecessary to perform any peripheral welding operations on the plates to be bond-welded, and this is advantageous particularly when small pieces are involved, and/or where the method is employed for the roll-welding of materials between which there is a large difference in the coefficient of thermal expansion. Another advantage in the box method lies in the fact that any number of pairs of plates may be simultaneously roll-welded in a single box, thereby reducing the number of peripheral welds which are necessary per final plate; this circumstance may more than offset the cost of the extra steel employed in making the box. Still another advantage of the box method is that it minimizes the subsequent labor and cost of surface preparation of the finished plate.

In both the box method and the sandwich method, the hard steel is substantially sealed off from the ambient atmosphere in the furnace or out. This is preferred because, for ordinary rolling purposes, it is usually undesirable to heat hard steel, such as the Ryalloy mentioned above, while in contact with ambient atmosphere, above about 2150° F., for otherwise it will decarburize badly and is likely to "burn." Good rapid welding can, however, be obtained at rolling temperatures above 2150° F. and the employment of such temperatures ordinarily is desirable. I have found by experiment that with the specific steel mentioned above I could use temperatures as high as 2300° F. without injuring the steel. This freedom from injury is obtained, as indicated above, by the exclusion of the ambinet atmosphere from the hard steel. In practice, I prefer to work this particular steel at temperatures between 2200° F. and 2250° F. More generally, for good rapid welding I usually prefer to work the hard steel above what may be called the "safe" temperature, that is above the temperature at which the hard steel can be safely worked while in contact with ambient atmosphere without undesirably affecting and/or injuring the hard steel.

It should be emphasized that the surfaces of the hard and tough steel which contact at the interface, after having once been cleaned, are kept clean and free from scale or oxide throughout all the subsequent operations by virtue of the fact that they are sealed in the pack. It has been pointed out above that sand-blasting, for example, does not produce a desirable surface for contact at the interface because of the impurities which it introduces in the form of sand. As a result of the initial cleaning operations and of the exclusion of the ambient atmosphere throughout all the heating and rolling operations, the interface is substantially clean, that is, substantially free from impurities (except such impurities as may be in the steel itself) as has been repeatedly verified by microscopic examination. Older methods of making composite plate which involve casting one metal against a hot slab of the other metal do not produce clean interfaces of this sort because the heated slab accumulates scale and oxide on its surface before and during the pouring of the other metal, which impurities are present in the final product. Moreover, in some, or perhaps all, of the previous casting methods, the deposited metal itself could hardly be expected to be clean, and in addition it is to be expected that a segregated core would develop in the cast or deposited metal close to the interface.

After the sandwich or box has been prepared, as shown in Fig. 1 or 2, the assembly is slowly heated in a furnace to a temperature of about 2200° F., and is then rolled down by the usual methods until its thickness has been reduced to, roughly, half (in this first rolling the amount of reduction may be varied over a fairly wide range). After this first preliminary rolling I put the assembly back into the furnace and maintain it at a temperature of approximately 2200° F. for several hours. Under these conditions there is a fairly rapid migration of the carbon from the high carbon hard steel into the low carbon tough steel. Fig. 3 is a diagrammatic representation corresponding to a microphotograph showing the extent to which carbon migrates from the hard high carbon steel plate 20 to the soft lower carbon steel 21 in a period of 3½ hours at a temperature of 2200° F. to form a diffusion zone of material and substantial thickness. The scale of the drawing is such that the region labeled "diffusion zone" is approximately .080" to .100" thick, as was actually ascertained in this case. The arrows indicate the approximate position of the original interface between plates 20 and 21.

The existence of this diffusion zone is of great importance both for the subsequent operations in manufacture and for the properties of the final plate. One of the difficulties which has not hitherto been recognized in the roll-welding of composite plates arises from the fact that the hard steel is much less plastic at final rolling temperatures than the tough steel. As a result of this there is a tendency during subsequent rolling for creepage to occur at the welded interface and this creepage in turn tends to weaken or even destroy the weld that had previously been made. By virtue of the carbon gradient, however, there is a more or less gradual change in plastic properties from the hard steel to the tough steel and the difficulties arising from differential plasticity during subsequent rolling to final thickness are thereby minimized or obviated. By actual experiment I have found it possible to make welds in this manner whose strength is, as nearly as could be determined, approximately equal to that of the hard steel and, therefore, greater than that of the tough steel. A weld whose strength is at least equal to that of the weaker of the two components welded together may properly be called "isosthenic" (Greek, combining form "iso" meaning equal, and the Greek noun "stenthos" meaning strength), and this term is used in the specification and claims with this meaning. Furthermore, the avoidance of an abrupt change in mechanical properties at the welded interface is of value for ballistic purposes also. It is known that discontinuities of any sort create concentrations of stress. By avoiding the discontinuity or abrupt change in mechanical properties which would otherwise occur in the composite plate, I likewise minimize the concentration of stress that would otherwise occur, and hence substantially improve the ballistic properties of the plate.

Composite armor plate containing a diffusion zone of material thickness in the region of the interface between welded plates of hard and tough steel, when properly heat-treated, exhibits high resistance to armor piercing projectiles and is highly resistant to shattering or spalling. In order that these properties may be attained it is important that the steels of the hard and soft plates be in effect blended together in the region of the welded interface with essential continuity of metal structure. During the "heat soak" the high-carbon steel loses carbon to the low-carbon steel in the region of the welded interface and forms a diffusion zone in this region, the result being a gradual decrease or gradient of carbon content from the body portion of the hard steel to the body portion of the soft steel. The resulting composite armor plate is thereby enabled to withstand the very severe treatment for which it is designed without failure at the zone of union between the hard and soft plates. In this connection armor plate is designed to be subjected to strains up to and beyond, the maximum stresses that the steel will stand. The requirements for armor plate are, therefore, entirely different from the requirements of steel for ordinary purposes. Thus, in the fabrication of corrosion-resisting or "stainless" steel articles comprising a backing sheet of steel and a surfacing or cladding of corrosion-resisting steel, requirements for the bond between the backing and the cladding steels need not be of very high strength, since such articles ordinarily are manufactured with a good safety factor, and the bond between the two metals, therefore, is not subjected to great stress. In the case of armor plate, however, there is no safety factor and the weld, or zone of union, between hard and soft steels should be such that the weld, or zone of union, will not fail under stresses up to the maximum that the steel will withstand. According to the present invention, I have produced composite armor plate wherein the hard and soft plate elements are united in this way. So far as I am aware, this has not previously been accomplished.

It will be obvious that in composite plates made according to my process a section taken at any place in the plate would show under microscopic examination substantially the same diffusion zone as in any other section. That is to say, the diffusion zone in my composite plates is substantially uniform laterally throughout the plates. Of course, there may be some differences between the depth of the diffusion zone in the center as compared with the edges, due to the fact that the edges will heat up more rapidly than the center in bringing the piece up to the temperature of the "heat soak," but these differences will be of a minor magnitude, and I may therefore describe these diffusion zones as "laterally uniform," with the implication that it is not strictly uniform but substantially so.

The two steels selected for description illustrate a further factor which is usually present, viz., that the hard steel and the tough steel will differ in their composition in other respects, besides the difference in carbon content. Other alloy elements, like manganese, nickel, chromium, molybdenum and vanadium, will also diffuse under the "heat soak." While such diffusion is very slow, compared with the rate of carbon diffusion, nevertheless there is some diffusion of these other ingredients which is also beneficial to the bond.

The thickness of the carbon diffusion zone or gradient region is determined by various factors, e. g., the temperature of the heat soak, the time of the heat soak, and the subsequent reduction after the heat soak. It also depends upon the difference in concentration of the substance in question between the united plates. No specific limits on the ultimate thickness of this diffusion zone can be given as it will naturally vary to a very great extent with the properties desired and with the final thickness of the plate, but, in any case, a diffusion zone of substantial and material thickness is produced. The specific times and temperatures mentioned above are intended for illustrative purposes only.

It will be understood that after the rolling operations are complete the sides of the sandwich, shown in Fig. 1, are trimmed away so as to remove the side bars 3 and the overhanging portions of the tough plates 1—1. The sandwich then separates into two composite plates which are then fabricated to desired form and size, after which the material is heat treated, as will be understood by those skilled in the art, so as to harden the hard steel to the desired degree. Ordinarily a Brinell of about 550 to 600 is wanted on the hard face, and a Brinell of about 250 to 350 on the tough face. Likewise, in the event that the box method is used, after the completion of the hot rolling operations, the sides are trimmed away and the cover plates removed so as to remove the rolled composite plates inside, which can then be fabricated and heat treated as described above.

I have described my invention in connection with composite plates comprising a single plate of tough steel and a single plate of hard steel; it will be understood, however, that composite plates may be made in accordance with my invention, which comprise any number of alternate layers of hard steel and tough steel; for example, I may make composite armor plate which consists of a layer of hard steel, then a layer of tough steel, then another layer of hard steel and then another layer of tough steel. Such multiply steels offer ballistic advantages, as has been shown in actual ballistic tests. Moreover, such structures have two other very significant advantages. In the first place, a fourply plate, for example, has much less tendency to warp in heat treating, than a corresponding carburized plate, a tendency which has hitherto been a constant source of fabricating difficulty. In the second place in a multi-ply structure such as a fourply, the type of steel and its thickness can be chosen in the most advantageous manner for each layer.

A composite multi-ply plate of the character above mentioned is exemplified in Fig. 4 wherein the component plates or layers 22 and 23 are of hard steel and the component plates or layers 24 and 25 are composed of tough steel. The common interfaces at the interior of the composite plate between the hard and soft steels are welded together and in the region of each of the common interfaces is a diffusion zone of material thickness which is of the character herein above described, and illustrated on a larger scale in Fig. 3, these zones being indicated by the reference characters 26, 27 and 28. In the example shown in Fig. 4, the component plates 22 and 23 may be of Ryalloy and the plates 24 and 25 may be S. A. E. Specification 4620, as above mentioned. However, it is not essential that the plates 22 and 23 be identical, or that the plates 24 and 25 be identical. In fact, for certain purposes, it may be desirable to use different hard steels for the hard layers and different tough steels for the tough layers.

In the making of composite plates of more than two layers of steel, the hard steel on the inside will, in general, lose carbon faster than the hard steel on the outer face, because the inner layer of hard steel will diffuse carbon to a tough layer on both its faces. In an experiment on a 4-ply plate, it was found that a 3½-hour "soak" at a temperature of about 2200° F. to 2250° F. had caused sufficient migration of carbon to make an appreciable reduction in the carbon content of the internal hard plate. In such cases care must be exercised to avoid too much decarburization of such internal hard plates. This is particularly important where the individual plates are thin.

The "heat soak," described above, will tend to enlarge the grain size of the steel. This disadvantage, however, can be overcome by proper selection of final rolling temperatures and by proper heat treatment, as is well known to those skilled in the art.

Among other advantages of my invention, it should be mentioned that the hard-face steels available at present, that is, carburized armor plates, are produced very slowly (and hence expensively) because of the extremely prolonged heating necessary for the carburization. My method should be materially less expensive than the carburizing method, because no such prolonged heatings are required. The cost of making the peripheral welds and the cost of the extra steel required for the sandwich or for the box are relatively small, calculated on a per pound basis of finished product, where the initial slabs are of good commercial size. For example, it is good commercial practice to roll a completed sandwich or box weighing 5000 to 10,000 pounds or more. Hence, when proper facilities are used for making the peripheral welds, their cost per pound of finished product is small.

While this invention has been described in connection with composite armor plate having different degrees of hardness or toughness, the component layers may differ from each other in other respects. For example, the component layers may differ from each other in resistance to chemicals, in thermal expansion, or the like, depending upon special purposes for which the plate is intended. In such case differences in the concentration of chemical substances other than carbon between the component layers or plates may be of primary significance, and the production of a diffusion zone of material thickness in which such substance varies from the concentration of the substance in the body portion of one component layer to the concentration of the substance in the body portion of another component layer united therewith, may be achieved according to this invention. The concentration or proportion of a substance or element may vary from zero in one component layer or plate to some substantial concentration or proportion in a component layer or plate united therewith; or the substance or element in question may be present in both, but in different concentrations or proportions.

While this invention has been described primarily in connection with armor plate, the features and advantages of this invention are of utility whenever a union of great strength and permanence is desired between steel plates, sheets, strips, or the like, which differ from each other in chemical composition by at least one chemical element or substance.

In the specification and in the claims, the word "plate" is used in a broad sense as embracing plate, sheet, strip, or the like.

While this invention has been described in connection with specific examples of the practice thereof, it is to be understood that this has been done for the purpose of illustration and that the scope of this invention is to be governed by the language of the following claims.

I claim:

1. In a process of manufacturing composite armor plates by welding together at their interface at least two plates of steel which differ in their carbon content, the steps comprising cleaning the plate surfaces to be welded together, placing said surfaces together and excluding the ambient atmosphere from said surfaces, then welding said surfaces by hot rolling the assembled plates, subjecting the composite plate including the welded interface to a temperature of about 2100° F. to about 2300° F. until a carbon diffusion zone of substantial thickness is formed in the region of said interface, and thereafter subjecting the composite plate to further hot rolling.

2. In a process according to claim 1, the exclusion of ambient atmosphere from the other parallel surface of the steel plate of higher carbon content during the rolling and heat treatment steps.

3. In a method of manufacturing composite plates by welding together at their interface at least two steel plates which differ substantially in their carbon content, the steps comprising placing said plates face to face and excluding ambient atmosphere from said contacting faces and from the other parallel face of the plate of higher carbon content, heating the assembly to a temperature above the safe temperature of the plate of higher carbon content, then working the assembly to form a preliminary surface-to-surface weld between the two plates at their interface, and thereafter subjecting the plates including the region of the preliminary weld to sustained heating at a temperature at which there is substantial migration of carbon from the plate of higher carbon content to the plate of lower carbon content to form a diffusion zone of substantial thickness in the region of said interface.

4. In a method of manufacturing composite plates by welding together at their interface at least two steel plates differing in their chemical composition with respect to at least one alloying element, the steps including placing the plates in a steel box, the interior of which is sealed from ambient atmosphere and the cross-sectional area of the metal of which is at least 25% of the total cross-sectional area, heating the box and plates contained therein to a temperature above the safe temperature of at least one of the plates, then rolling the assembly at such temperature to form a preliminary surface-to-surface weld between the two plates at their interface, and thereafter subjecting the assembly including the region of the interface to sustained heat to form a diffusion zone of substantial thickness in the region of the interface with respect to said alloying element.

5. In a method of manufacturing composite plates by welding together at their common interface steel plates which differ from each other in chemical composition with respect to at least one alloying element, the steps of first forming at elevated temperature a preliminary surface-to-surface weld between said plates at their common interface, and then subjecting the resulting composite plate including the region of said surface-to-surface welded interface to sustained heating at a temperature at which there is substantial diffusion of said element between said plates in the region of said welded interface.

6. In a method comprising the steps of claim 5, the carrying out of said first step of forming a preliminary surface-to-surface weld at the common interface between said plates by working said plates at elevated temperature with exclusion of ambient atmosphere from the surfaces at the common interface to be welded, and wherein, following the second step wherein the diffusion zone is formed, subjecting the composite plate to further working at elevated temperature.

7. In a method comprising the steps of claim 5, the carrying out of the first step of forming a preliminary surface-to-surface weld at the common interface between said plates, by working said plates at elevated temperature with exclusion of ambient atmosphere from the surfaces at the common interface to be welded and from the other face of at least one of said plates, said plates being worked as aforesaid at a temperature above the safe temperature of the protected plate.

8. In a method of manufacturing composite plates by welding together at their common interface steel plates which differ from each other in their carbon content, the steps of first forming at elevated temperature a preliminary surface-to-surface welded bond at the interface between said plates and then subjecting the resulting composite plate including the region of said bonded interface to sustained elevated temperature to form a carbon diffusion zone of material thickness at the region of said bonded interface.

9. In a method according to claim 8, the performing of said second step at a temperature of about 2150° F. to about 2300° F.

10. In a process of manufacturing composite steel plates according to claim 8, the performance of said second step at a temperature at which there is substantial migration of carbon content from the plate of higher carbon content to the plate of lower carbon content and until a diffusion zone of substantial thickness is formed in which the carbon content decreases continuously from that of the body portion of the plate of higher carbon content to that of the body portion of the plate of lower carbon content.

11. In a process of manufacturing composite steel plates, the steps according to claim 8 and, following the step wherein the diffusion zone is formed, again working the composite plate at elevated temperature.

12. In a process according to claim 8, the subjecting to the said steps of at least two plates of hard steel arranged alternately with at least two plates of tough steel of lower carbon content than the carbon content of the hard steel, and the formation of said carbon diffusion in the region of each interface between said hard and said tough steel plates.

13. In a method comprising the steps of claim 8, the carrying out of said first step of forming a preliminary surface-to-surface weld at the common interface between said plates by working said plates at elevated temperature with exclusion of ambient atmosphere from the surfaces at the common interface to be welded, and wherein, prior to said first step, the surfaces to be welded are cleaned so as to remove substantially all impurities, other than impurities in the metal of the plates themselves.

14. In a method comprising the steps of claim 8, the carrying out of the first step of forming a preliminary surface-to-surface weld at the common interface between said plates, by working said plates at elevated temperature with exclusion of ambient atmosphere from the surfaces at the common interface to be welded and from the other face of at least one of said plates, said plates being worked as aforesaid at a temperature above the safe temperature of the protected plate.

15. In a process of manufacturing steel plates, the steps according to claim 8, and wherein the surfaces to be united are cleaned and, while clean and free of oxide, are coated with a light covering of hydrocarbon prior to placing said surfaces together and forming a surface-to-surface weld therebetween.

BENJAMIN LIEBOWITZ.

REFERENCES CITED

The following references are of record in the file of this patent:

UNITED STATES PATENTS

| Number | Name | Date |
|---|---|---|
| 362,806 | Wilson | May 10, 1887 |
| 371,129 | Dyer | Oct. 4, 1887 |
| 529,050 | Tresidder | Nov. 13, 1894 |
| 906,846 | D'adda | Dec. 15, 1908 |
| 967,146 | Simpson | Aug. 9, 1910 |
| 1,016,560 | Gioletti | Feb. 6, 1912 |
| 1,043,416 | Gioletti | Nov. 5, 1912 |
| 1,886,615 | Johnson | Nov. 8, 1932 |
| 1,896,411 | Maskrey | Feb. 7, 1933 |
| 1,956,818 | Acre | May 1, 1934 |
| 2,018,725 | Johnson et al. | Oct. 29, 1935 |
| 2,079,213 | Ingersoll | May 4, 1937 |
| 2,191,472 | Hopkins | Feb. 27, 1940 |
| 2,226,403 | Hopkins | Dec. 24, 1940 |
| 2,241,270 | Nipper | May 6, 1941 |
| 2,249,629 | Hopkins | July 15, 1941 |

OTHER REFERENCES

Pract. Metallurgy, Van Horn & Sachs. Published 1940 by Cleveland Soc. for Metals, pp. 456, 457.